United States Patent [19]
Shaffer

[11] Patent Number: 5,022,277
[45] Date of Patent: Jun. 11, 1991

[54] SCREW AND NUT MACHINE

[75] Inventor: James E. Shaffer, Maitland, Fla.

[73] Assignee: Consolier Industries, Inc., Riviera Beach, Fla.

[21] Appl. No.: 397,107

[22] Filed: Aug. 22, 1989

[51] Int. Cl.$^5$ ............................................. F16H 25/22
[52] U.S. Cl. .................. 74/424.8 NA; 74/424.8 R; 74/459
[58] Field of Search ..... 74/89.15, 424.8 R, 424.8 NA, 74/459

[56] References Cited

U.S. PATENT DOCUMENTS

| | | | |
|---|---|---|---|
| 2,482,082 | 9/1949 | Wahlberg | 74/459 |
| 2,890,594 | 6/1959 | Galonska | 74/424.8 |
| 3,154,954 | 11/1964 | Geyer | 74/89 |
| 3,371,551 | 3/1968 | Profet | 74/424.8 |
| 3,393,575 | 7/1968 | Irwin | 74/424.8 |
| 3,636,780 | 1/1972 | Wallace | 74/89.15 |
| 4,070,921 | 1/1978 | Arnold | 74/459 |
| 4,597,305 | 1/1986 | Brosasco | 74/424.8 A |
| 4,612,817 | 9/1986 | Neff | 74/424.8 NA |
| 4,685,344 | 11/1987 | Horn et al. | 74/424.8 NA |
| 4,718,291 | 1/1988 | Wood et al. | 74/89.15 |

FOREIGN PATENT DOCUMENTS

| | | | |
|---|---|---|---|
| 2839920 | 3/1980 | Fed. Rep. of Germany | 74/89.15 |
| 3417056 | 11/1985 | Fed. Rep. of Germany | 74/424.8 R |
| 3616905 | 11/1987 | Fed. Rep. of Germany | 74/424.8 R |
| 629385 | 9/1978 | U.S.S.R. | 74/424.8 R |

Primary Examiner—Allan D. Herrmann
Attorney, Agent, or Firm—Harry W. Barron

[57] ABSTRACT

A ball screw has a plurality of planar tracks of bearing balls arranged around the inner surface of the nut of a screw and nut machine. The shape of each track is designed to fit around a planar cross-section of the screw threads and each of the plurality of tracks is oriented at different angles with respect to the other tracks. A carrier is placed between the nut and screw and maintains the bearing balls separated from one another. In addition, each of the plurality of tracks are spaced at a fraction of the pitch of the screw thread pitch. By making each track planar, the bearing balls circulate within each track independently of the other tracks. In addition, a technique to design the shape of the track for a given thread shape includes determining the tangential point of each ball along the thread. The tracks may be divided into groups having a forward drive and reverse drive bias and the track may be made larger than the bearing balls to reduce wear at the thread peak.

45 Claims, 5 Drawing Sheets

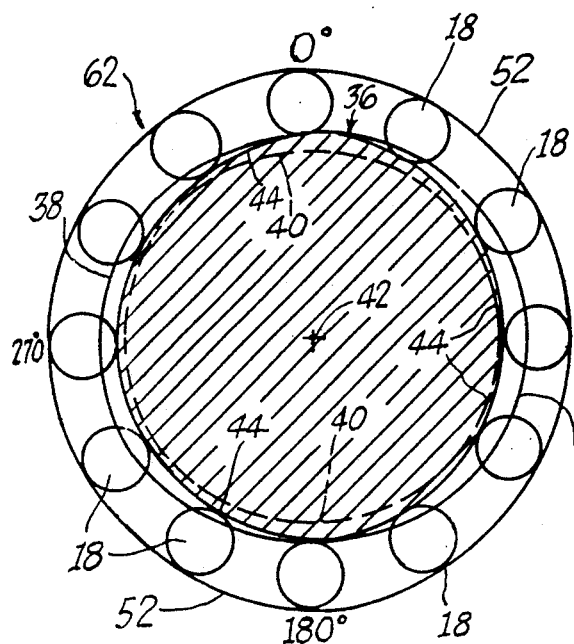
Fig. 9.
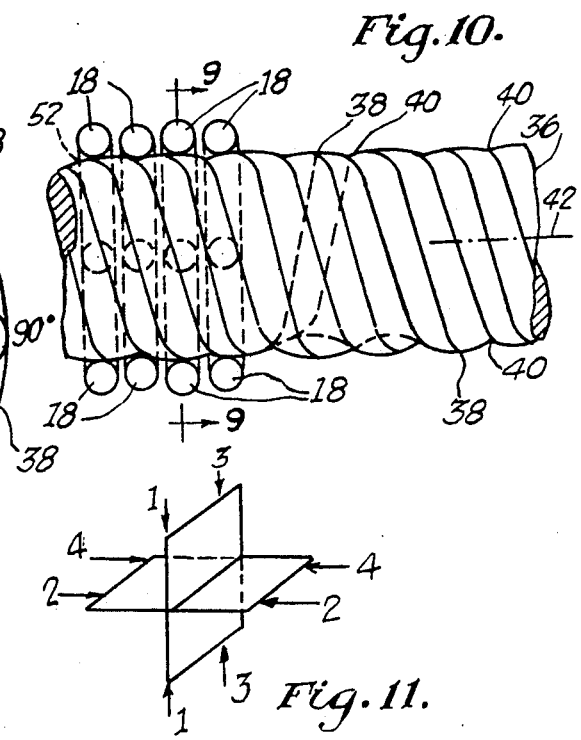
Fig. 10.
Fig. 11.
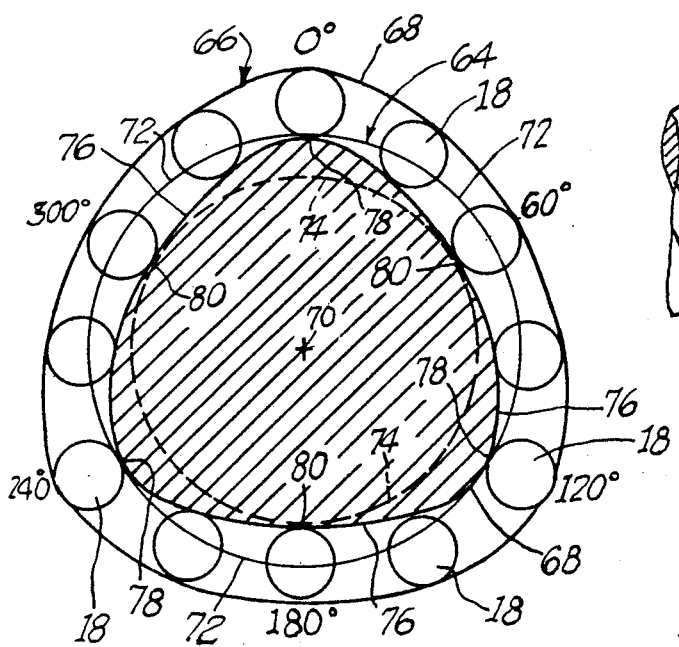
Fig. 12.
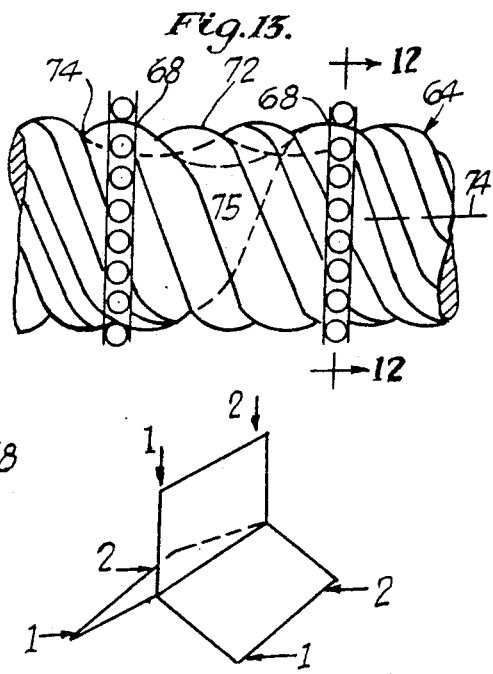
Fig. 13.
Fig. 14.

SCREW AND NUT MACHINE

This invention relates to a screw and nut machine, and more particularly, to such a machine in which bearing balls are used in to reduce the friction between the screw and nut and in which the bearing balls are arranged along a plurality of planar tracks.

BACKGROUND OF THE INVENTION

The screw and nut is one of the classical mechanical machines. In one typical use of the screw and nut machine, the screw is rotated by an external driving means, such as a motor, about its axis. The rotation of the screw then drives the nut axially, that is, parallel to the axis of the screw. By affixing another device to the nut, the rotational movement of the motor is transformed to lateral movement for that other device.

In its simplest form, the screw and nut machine makes use of the contact between matching helical threads on both the screw and the nut to cause the transformation of rotational movement to axial movement. This contact, however, creates a great amount of friction through which energy is lost. In addition, considerable heat may be generated to destroy the mechanisms under certain circumstances. To overcome this friction, people long ago suggested replacing the threads of the nut with helical tracks of bearing balls which roll along the rotating screw, and thereby substantially reduce the amount of friction between the screw and nut.

DESCRIPTION OF THE PRIOR ART

Because the bearings roll in typical ball screw configuration, it is necessary to recycle the bearings from one end to the other during the use of the ball screw. This typically requires that an external path be provided for the bearings. For example, references made to U.S. Pat. No. 2,890,594 in the name of D. A. Galonska entitled, "Helical Spline Assembly" and to U.S. Pat. No. 3,154,954 in the name of H. M. Geyer entitled, "Mechanical Rotary Actuator" which show such an external path. Other patents which show ball screws generally, are U.S. Pat. No. 3,636,780 in the name of H. L. Wallace entitled, "Actuatable Drive Screw Device"; U.S. Pat. No. 4,597,305 in the name of E. Brusasco, entitled "Screw-Nut Screw Coupling With Ball Circulation And A Method For Its Assembly", and U.S. Pat. No. 4,685,344 in the name of M. Horn, et al, entitled, "Helical Ball Gear".

One of the problems with the aforementioned ball screw devices is that the bearing balls must be recirculated due to the rolling nature thereof from one end to the other end of the nut. This creates a difficult manufacturing/assembly task, thereby increasing the cost. Further, the recirculation requirement increases the bulk of the nut, making it difficult to use in certain applications. To overcome these problems, some people have suggested various techniques in which the bearing balls rotate in a quasi circular fashion. This may be accomplished by providing a return groove within each helical groove. In other words, the groove shape is generally helical, except for a short section which axially jogs from the end to the beginning of each helical thread.

Examples of such apparatus are shown in U.S. Pat. No. 3,371,551 in the name of A. G. Profet entitled, "Nut And Screw Mechanism"; U.S. Pat. No. 3,393,575 in the name of A. S. Irwin entitled, "Ball Screw Actuator"; U.S. Pat. No. 4,070,921 in the name of F. Arnold entitled, "Screw Spindle", U.S. Pat. No. 4,612,817 in the name of K. Neff entitled, "Circulating Ball Worm Drive"; and U.S. Pat. No. 4,718,291 in the name of R. A. E. Wood, et al entitled, "Devices For Converting Rotary Movement Into Linear Movement".

In each of the aforementioned patents, the jog in each helical thread permitting the bearing balls to circulate around each thread, creates several problems. The first problem involves the manufacturability of such a product, where it is extremely difficult and expensive to mass produce such a product on conventional machines. More important, however, the jog within each nut thread causes a significant decrease in the performance of the device, in that the screw must rotate slower due to the required change in path direction which the bearing balls must follow.

What is needed is a device in which the bearing balls are free to rotate around a single path without an interfering axial jog and further without the necessity to return the bearing balls from one end to the other of the nut. Such a device should be adaptable to ease of manufacturing and should have the attribute of high speed as required for many applications.

SUMMARY OF THE INVENTION

In accordance with one aspect of the subject invention, there is provided a screw and nut machine comprising a rotatable first member having a helical thread, a plurality of bearing balls and a second member having a plurality of planar tracks for containing the bearing balls. Each track is shaped relative to the cross-sectional profile of the first member at the position of that track around the first member to permit at least one of the bearing balls of each track to contact the thread.

BRIEF DESCRIPTION OF THE DRAWINGS

One preferred embodiment of the subject invention is hereafter described, with specific reference being made to the following Figures, in which;

FIG. 9 shows the manner in which the bearing balls may be placed around the threads of a dual lead screw;

FIG. 10 shows the dual lead screw with four rows of bearing balls positioned therearound;

FIG. 11 is a schematic view showing the manner in which the bearing balls may be positioned relative to the threads of the dual lead screw to provide two dimensional stability;

FIG. 12 shows the manner in which the bearing balls may be placed around the threads of a triple lead screw;

FIG. 13 shows the triple lead screw with four rows of bearing balls positioned therearound;

FIG. 14 is a schematic view showing the manner in which the bearing balls may be positioned relative to the threads of the triple lead screw to provide two dimensional stability;

DETAILED DESCRIPTION

Figure 1:
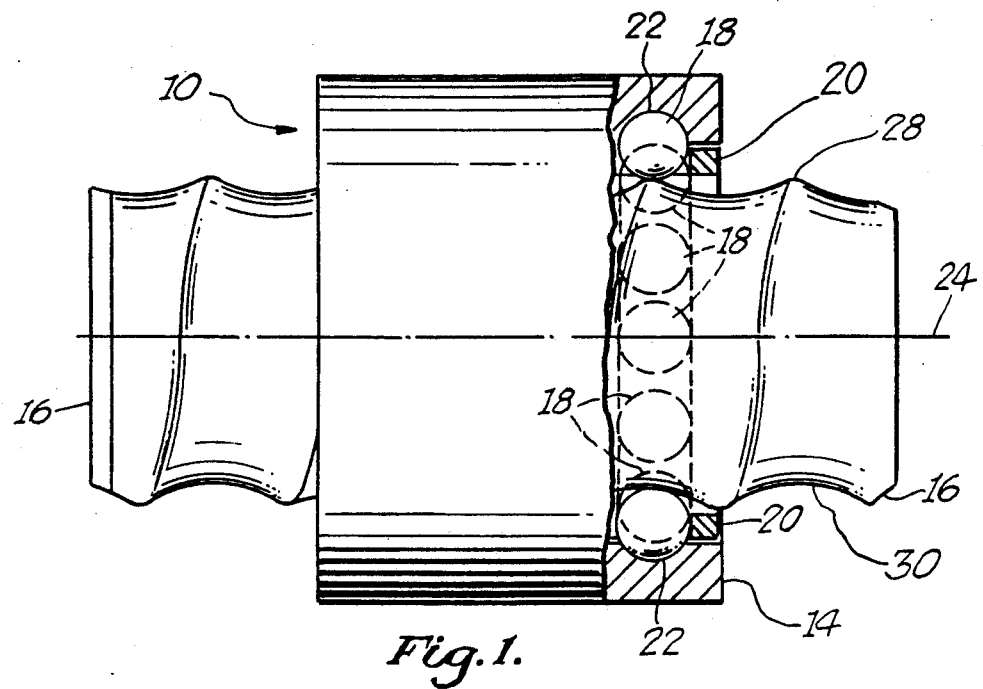
FIG. 1 shows one embodiment of the improved screw and nut machine of the subject invention, partially cut-away, for a single lead thread.

Referring now to FIG. 1, a first embodiment of the screw and nut machine 10 of the subject invention is shown. Machine 10 includes a nut 14, which is to be moved axially by a screw 16 rotating within nut 14. Alternatively, nut 14 could be rotated in order to move screw 16 axially. In either case, the rotating member is axially held and the axially moving member is rotationally held.

Nut 14 includes a plurality of rows of bearing balls 18 (only one of which rows is shown in FIG. 1), held in place by a carrier 20. The size of the bearing balls 18 and displacement of the nut 14 from screw 16 are selected so that the balls are held against the nut 14 by the screw 16. The exact number of rows of bearing balls 18 will depend upon the design of screw and nut machine 10, as will be described in more detail hereafter. The radial centers of each of the bearing balls 18 in each row are all in a common plane. This common plane placement of the bearing balls 18 constitutes the basic premise of the subject invention.

As noted above, each of the various rows of bearing balls 18 are held against track 22, which is formed on the interior surface of nut 14. In the simplest embodiment, track 22 is circular in shape and eccentric from the center axis 24 of screw 16. The amount and angle of eccentricity for track 22 is selected so that each of the bearing balls 18 tangentially contacts screw 16. This will be described in more detail hereafter with respect to FIG. 6.

Figures 2, 3:
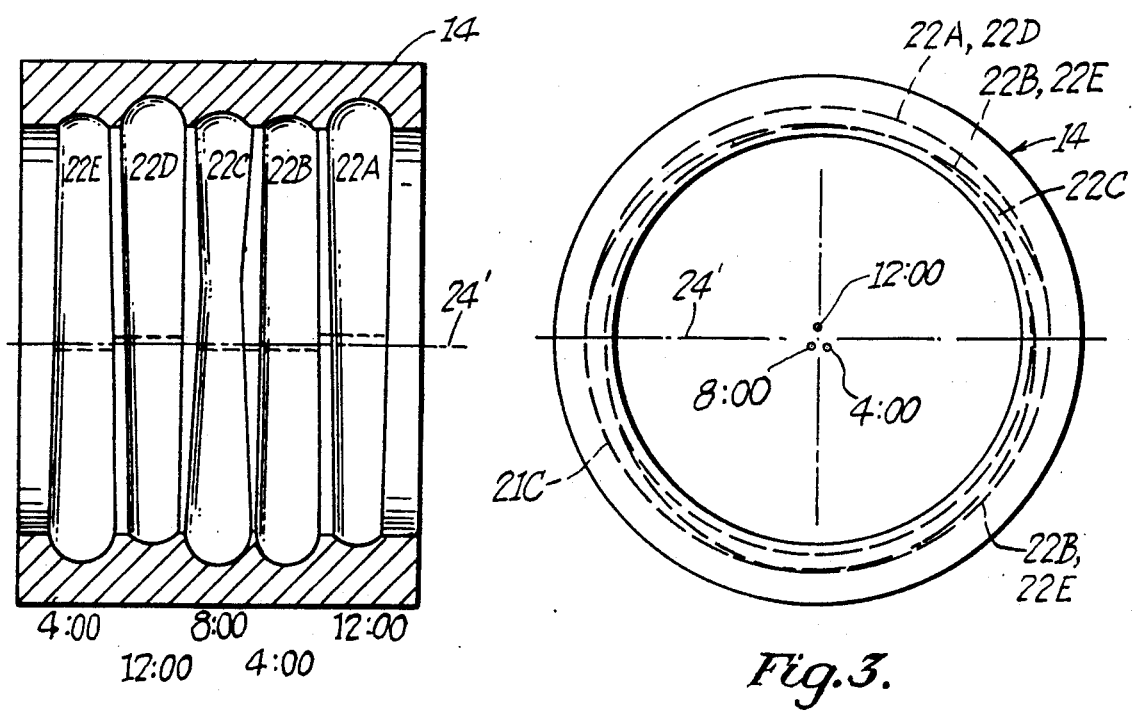
FIG. 2 shows a cross sectional view of the nut portion of the screw and nut machine shown in FIG. 1.
FIG. 3 is an end orthogonal planar view of the nut portion shown in FIG. 2.

Referring now to FIGS. 2 and 3, a lateral cross-sectional view of nut 14 normal to center axis 24, is shown. Nut 14 is fabricated using five tracks 22A through 22E for holding bearing balls 18. The five tracks 22A through 22E are arranged in three eccentric positions separated by 120° from one another, which have been labeled as 12:00, 4:00 and 8:00, respectively, and which labelings are all relative. As will be shown hereafter with respect to FIG. 8A, five tracks is the desired number of tracks required to assure two dimensional stability for nut 14 on single lead screw 16. More specifically, tracks 22A and 22D are eccentric at 12:00, (which is an assumed home or vertical upward position), tracks 22B and 22E are eccentric at 4:00 and track 22C is eccentric at 8:00. The eccentricity of each of the tracks 22A through 22E is with respect to axis 24' of nut 14, which is the same as axis 24 of screw 16. When dealing with round tracks, the amount of eccentricity for each of the tracks 22A through 22E relative to the center of nut 14 is approximately one half the distance between the peak 28 and valley 30 of the threads of screw 16 (see FIG. 1). This will be described in more detail with respect to FIG. 6 hereafter.

Figure 4:
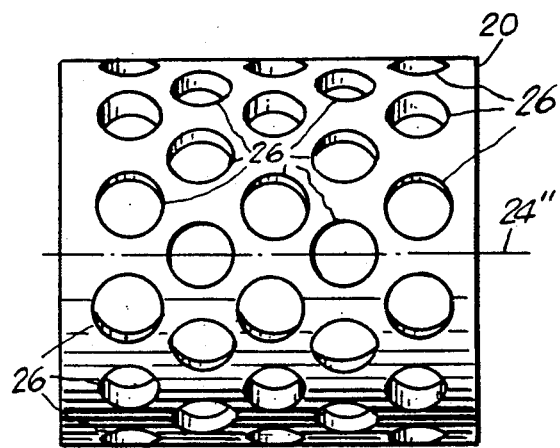
FIG. 4 shows a side prospective view of the carrier used in the screw and nut machine shown in FIG. 1.
Figure 5:
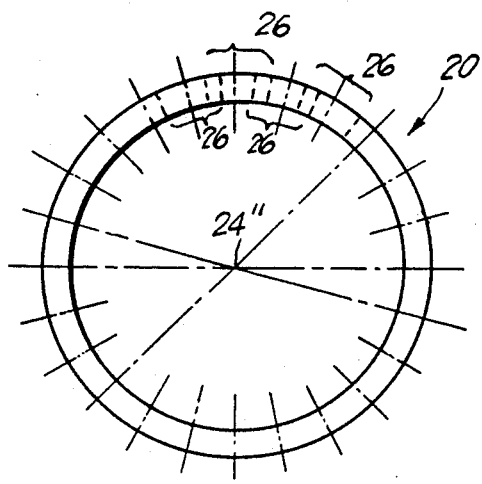
FIG. 5 shows an orthogonal end planar view of the carrier shown in FIG. 4.

Referring now to FIGS. 4 and 5, carrier 20 is shown. The inner diameter of carrier 20 is slightly greater than the outer diameter of screw 16 taken at the peak 28 of each of the threads. The outer diameter of carrier 20 is slightly less than the inner diameter of nut 14, as seen in FIG. 2. Furthermore, carrier 20 has an axis 24" the same as axes 24 and 24', and thereby, carrier 20 is positioned coaxial with screw 16 and nut 14. Thus, carrier 20 may be freely interposed between nut 14 and screw 16, as seen in FIG. 1. Positioned around carrier 20 are a plurality of circular openings 26, each having a diameter slightly greater than the diameter of each bearing balls 18. Each of the circular openings in carrier 20 are arranged along a circular path of the generally cylindrical shaped carrier 20 and are positioned at thirty degree increments along each circular path. Adjacent rows have the circular openings 26 interleaved, so that they are fifteen degrees apart from one another. Of course, if smaller bearing balls were used, the interleaving would be unnecessary and the openings 26 could be placed closer together.

The purpose of each of the openings 26 is to maintain the bearing balls 18 separate from one another in high speed applications so that they roll against screw 16 without contacting one another. The side view of carrier 20 is shown in FIG. 5 with selected one of the holes 26 shown by dashed lines. The remaining holes are centered on the various diameter lines separated from one another by fifteen degrees continuously around the circumference of carrier 20. By making each of the openings 26 slightly larger than the bearing balls 18, the bearing balls 18 may move up and down through the openings 26 as dictated by the eccentricity of the various tracks 22A through 22E shown in FIG. 2 and by the bearing balls' 18 contact with the screw 16. Alternatively, carrier 20 could be replaced by individual carriers (not shown) for each individual row, or may be eliminated entirely.

Figure 6:
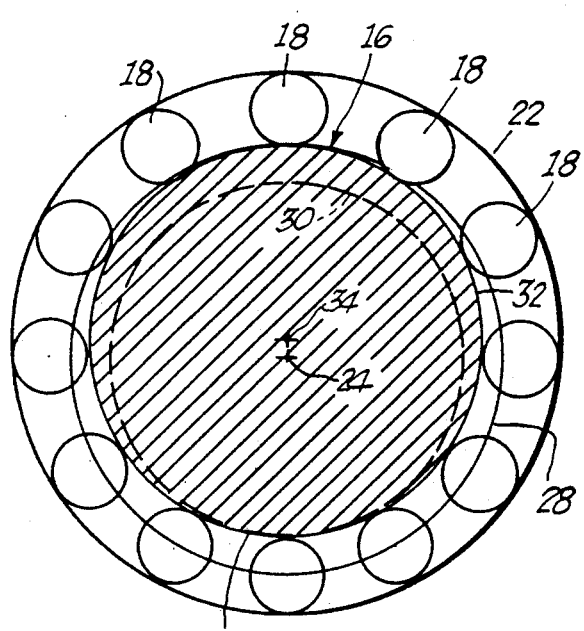
FIG. 6 shows the manner in which the bearing balls may be placed around the threads of a screw.
Figure 7:
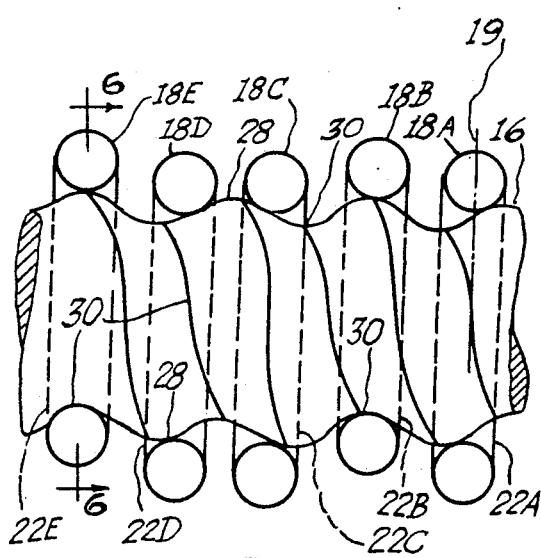
FIG. 7 shows a single lead screw having five rows of bearing balls positioned thereon.

Referring now to FIGS. 6, 7, 8A and 8B, the manner of placing the bearing balls 18 for a single lead helical thread, such as screw 16 shown in FIGS. 1 and 7, will be described. FIG. 6 is a cross-sectional view taken across lines 6—6 of screw 16 as seen in FIG. 7. In FIG. 6, the peak of the thread 28 forms an outer circle which is concentric with axis 24. Similarly, in FIG. 6, the thread valley 30 also appears as a concentric circle with respect to axis 24. However, because both thread peak 28 and thread valley are part of a helical thread on screw 16, the cut at a plane, represented by line 6—6 in FIG. 7, results in an eccentric shape 32 representing the transition from thread peak 28 to thread valley 30. It should be understood that while line 32 is shown as an eccentric circle, it need not be such a configuration; the exact configuration of eccentric shape 32 will depend upon the shape of the thread profile on screw 16. If the thread profile of screw 16 has a sine wave shape, as seen in FIG. 7, the shape of eccentric 32 will be circular from eccentric point 34. This shape will be used in FIGS. 6 and 7 for explanatory purposes only. Other shapes will be shown and discussed hereafter with respect to FIGS. 20 through 22.

As seen in FIG. 6, the bearing balls 18 are placed around screw 16 so that each bearing ball 18 is tangent against a portion of the thread along eccentric shape 32. Thus, the radial center of each of the bearing balls 18 follows a path which is circular from eccentric point 34. The distance between point 24 and 34 is equal to approximately one-half of the distance from the peak 28 to the valley 30 of the thread of screw 16. In other words, the path of the bearing balls 18 form an eccentric circle from point 34 relative to the axes 24, 24' and 24". It should also be noted that each of the bearing balls 18 also are in contact with one of the channels 22, which similarly must be in the shape of a circle from eccentric point 34. In the situation shown in FIG. 6, the 12:00 positioning of one of tracks 22A or 22D is shown. The 4:00 position is the same as FIG. 6 rotated clockwise by 120° and the 8:00 position is the same as FIG. 6 rotated clockwise by 240°.

While in the simplest case illustrated in FIG. 6, each of the bearing balls 18 contacts the thread along line 32, this is not necessarily required for proper operation of the subject invention. What is required, is that none of the bearing balls 18 extend internal to line 32 along the path that they travel through one of the tracks 22A through 22E. Further, in order for proper operation to occur, it is required that at least one of the bearing balls 18 contact the thread between peak 28 and valley 30, so that a driving force can be imparted from the screw 16 to the nut 14 to cause the axial motion of the nut 14. Preferably, of course, more than one of the bearing balls 18 will contact the thread of screw 16 along multiple tangent points of line 32. It should be noted that the tangent bearing balls 18 may be tangent at a point other than along normal line 19 between the center of the ball and screw 16, such as for bearing balls 18A, 18C and 18D seen in FIG. 7.

Figure 8B:
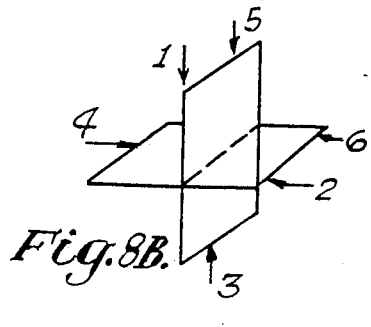
FIG. 8B is a second schematic diagram showing a second manner in which the bearing balls may be positioned relative to the threads of the screw to provide two dimensional stability.
Figure 8A:
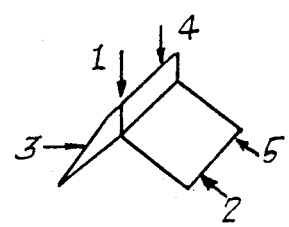
FIG. 8A is a schematic diagram showing one manner in which the bearing balls may be positioned relative to the threads of the screw to provide two dimensional stability.

Referring now to FIGS. 8A and 8B, the number of rows of bearing balls 18 necessary to obtain two dimensional stability of the nut 14 with respect to screw 16 is important to proper operation of the subject invention. By two dimensionally stability, it is meant that screw 16 cannot tip or tilt in either the pitch or yaw direction, relative to axis 24 (roll axis). Referring to FIG. 8A, it is assumed that the angles for the three eccentricities associated with channels 22A through 22E are radially spaced by 120°, as seen in FIG. 3, and that at least one bearing ball 18 from each track 22 contacts the thread of screw 16. This is represented in FIG. 8A by three planes at 120° to one another and by arrows representing the contact points.

Based on the assumptions above, simple triangulation in the diagram of FIG. 8A indicates that two dimensional stability can be achieved by placing two contact points on two of the planes and one contact point on the third plane. Thus, for nut 14, the first and fourth tracks 22A and 22D are eccentric at 0°, or 12:00, the second and fifth tracks 22B and 22E are eccentric at 120°, or 4:00 and the third row is eccentric at 240°, or 8:00. This provides triangulated stability for the pitch and yaw movement of screw 16 relative to nut 14.

Alternatively, as indicated by the diagram of FIG. 8B, if one were to make the various tracks 22 eccentric to one another by 90°, rather than 120°, it would be necessary to have at least three points in each of the X and Y planes. This would result in at least six tracks 22, as indicated by the arrows 1–6 in FIG. 8B. More specifically, the first and fifth tracks would eccentric be at 12:00, the second and sixth tracks would be eccentric at 3:00, the third track would be eccentric at 6:00 and the fourth track would be eccentric at 9:00.

It should be noted that the five or six rows required for two dimensional stability, discussed above with respect to FIGS. 8A and 8B, were based on the assumption that only one of the bearing balls 18 of each track 22 made contact with the threads of screw 16. If all of the bearing balls 18 around each track 22 made contact with the threads of screw 16 along line 32 of FIG. 6, then only two tracks would be needed in order to provide two dimensional stability.

Referring again to FIG. 7, the other critical feature in the proper operation of the subject invention is the positioning of the various tracks 22 within nut 14 relative to the pitch of the thread on screw 16. For track 22 eccentricity at angles of 120° with respect to one another, as seen in FIG. 2, the proper distance between the tracks (track pitch) is at nonintegral one-third increments times the pitch of the threads of screw 16. Thus, a track pitch of one-third, two-thirds, four-thirds, five-thirds, seven-thirds, eight-thirds, and so forth, times the pitch of screw 16 will function properly. In FIG. 7, a track pitch of two thirds is shown. If the eccentric angles of the tracks were 90°, as manifested by FIG. 8B, then the track pitch would be one-fourth, three-fourths, five-fourths, and so forth, of the screw 16 pitch.

The key to properly selecting the track 22 pitch with respect to the screw 16 pitch is that the orientation of the various tracks 22 must be multi-planar in order to provide two dimensional stability, that is both pitch and yaw stability. With multi-planar orientation, simple triangulation techniques, as described above with respect to FIGS. 8A and 8B, can be used for providing stability. Thus, whole number ratios of the track 22 pitch to the screw 16 thread pitch should not be used because such ratios will not permit multi-planar orientation and hence will not provide stability. Of course, it should be noted that stability may be provided by other techniques, such as external channels through which the nut 14 travels, in which case any pitch for the tracks 22 and any number of tracks 22 may be utilized.

Referring now to FIGS. 9, 10 and 11, a dual lead threaded screw 36 is shown using the concepts of the subject invention. In FIG. 9, which a cross-sectional view taken across the plane represented by lines 9—9 of FIG. 10, of dual lead screw 36 is shown. Generally speaking the peaks 38 of the thread and valleys 40 of the thread of screw 36 illustrated as concentric circles from axis 42 in FIG. 9, it being noted that the valleys 40 being hidden. In the cross-sectional view through line 9—9 of FIG. 10, which is taken across the peaks 38 at 0° (assumed to be vertically up on the drawings) and 180° and the valleys 40 at 90° and 270°, the thread line 44 appears to be elliptical in shape. In other words, the thread line 44 moves from the thread peak 38 to the thread valley 40 between 0° and 90° and back to the thread peak 38 at 180°. Similarly, the thread line 44 moves from the peak 38 at 180° to the valley 40 at 270° back to the peak 38 at 360°, or 0°. In the example shown in FIGS. 9 and 10, the thread shape is essentially elliptical, with a major axis being thread peaks 38 and the minor axis being thread valleys 40. The exact shape of thread line 44 will depend upon the profile of the threads of screw 36, as discussed hereafter with respect to FIG. 20.

In order to hold the bearing balls against the thread line 44, a track 52, similar to track 22, is formed in the nut 62. However, because of the shape of thread line 44, track 52 is formed to be generally elliptical in shape, rather than circular in shape as was track 22. This permits each of the bearing balls 18 to contact screw 36. In other words, track 52 is made similar to the shape to the thread line 44 so that bearing balls 18 will contact both screw 36 and track 52. While it is not necessary that all of the bearing balls 18 contact the threads of screw 36, at all times, it is preferable that as many bearing balls 18 make contact with the threads of screw 36, particularly at the areas between the peak 38 and valley 40. It is, however, necessary that none of the bearing balls 18 are forced by track 52 to be below the threads of screw 36 so as to cause a jam and prevent screw 36 from rotating.

Referring to FIG. 11, with the dual lead threaded screw 36, it is desirable that adjacent ones of the elliptical shaped tracks 52 be placed at 90° with respect to one another. Thus, as seen from FIG. 11, four tracks 52 formed within nut 62 are required to provide two dimensional stability between screw 36 and the nut 62. This assumes that at least one bearing ball 18 in each half of the elliptical shaped thread line 44 contacts both the track 52 and the screw 36. Again, nut 62 may include a carrier (not shown), similar to carrier 20, in order to maintain the bearing balls 18 separated from one another.

Referring now to FIGS. 12, 13 and 14, a triple lead screw 64 and associated nut 66 are shown. In order to use the invention with triple lead screw 64, nut 66 includes at least a pair of tracks 68 which are shaped similar to the cross-sectional thread line 76. Referring to FIG. 12, which is a cross-sectional view across lines 12—12 of FIG. 13, the thread peak 72 and thread valley are seen as concentric circles. Because of the triple thread configuration of screw 64, there are three thread peaks 78 at 0°, 120° and 240° and three thread valleys 80 at 60°, 180° and 300° for a cross-sectional view, such as line 12—12, taken through the peak 72 of screw 74 located at the highest point (0°). The cross-sectional thread line 76 is then the line connecting the peaks 72 to the valleys 74 of screw 64. Thus, thread line 76 is a triangular shaped curving line, which will be referred to as a trillipse.

Track 68 of nut 66 is made to correspond to the shape of thread line 76 so that the bearing balls 18 traveling in track around screw 64 will contact both track 68 and the threads of screw 64. If three bearing balls 18, one for each portion of the trillipse shaped thread line 76, in each track 68 contact both the track 68 and screw 64, then, as seen from FIG. 14, only two tracks 68 are required to provide three dimensional stability. Further, it is not necessary to orientate adjacent ones of the tracks 68 differently or to designate the pitch of the tracks 68 at any specific fraction of the pitch of the threads of screw 64 due to the requirement that one ball in each portion of the trillipse thread line 76 contact both the track 68 and threads of screw 64.

From the above description with respect to FIGS. 1 through 14, it is seen that the invention, in its simplest form, includes a plurality of bearing balls 18 arranged in a planar track 22, 52 or 68, which track is configured to keep an array of bearing balls 18 tangent to the thread line of a planar cross-section through the screw. As the screw turns, the nut is driven axially to maintain the position of each track of bearing balls 18 relative to the rotating screw threads. Keeping in mind the above principles of the simplest form of the improved screw and nut machine of the subject invention, one can build more complex and complicated machines for performing different tasks or performing simple tasks in a more efficient manner.

Figure 15:
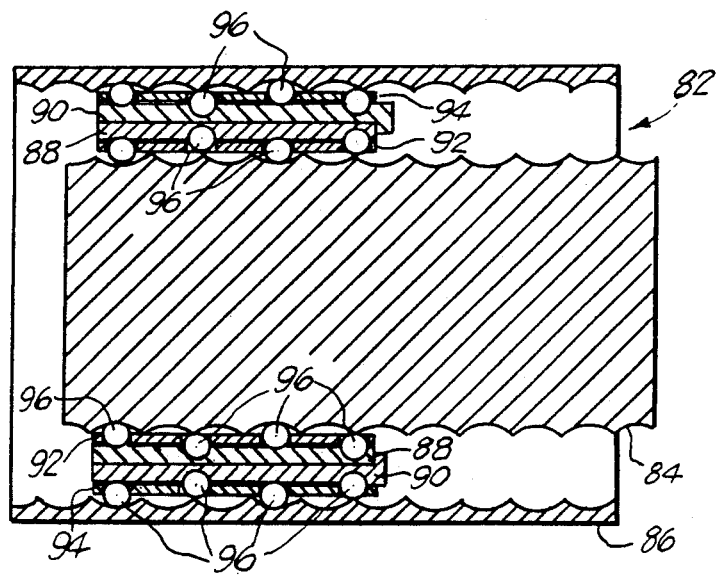
FIG. 15 shows another device using the improved screw and nut machine of the subject invention.

Referring now to FIG. 15, an In-Out-In type ball screw mechanism 82 is shown and includes an inner screw 84, similar to dual lead screw 36 previously described with respect to FIG. 10. In addition, mechanism 82 includes a hollow cylindrical shaped threaded housing 86 with the interior surface thereof containing dual lead threads. Because both inner screw 84 and threaded housing 86 have dual lead threads, the tracks of the nuts associated therewith will generally be elliptical in shape, as explained with respect to FIG. 9. For mechanism 82, separate inside nut 88 and outside nut 90 are provided, each of which has a respective inside carrier 92 and outside carrier 94 associated therewith for maintaining the position of the bearing balls 96 in the manner previously explained. Particularly with respect to threaded housing 86 and outside nut 90 and outside carrier 94, it can be seen that effectively the screw may consist of the planar tracks of bearing balls 96 and the nut can be the helical threads on housing 86.

Figure 18:
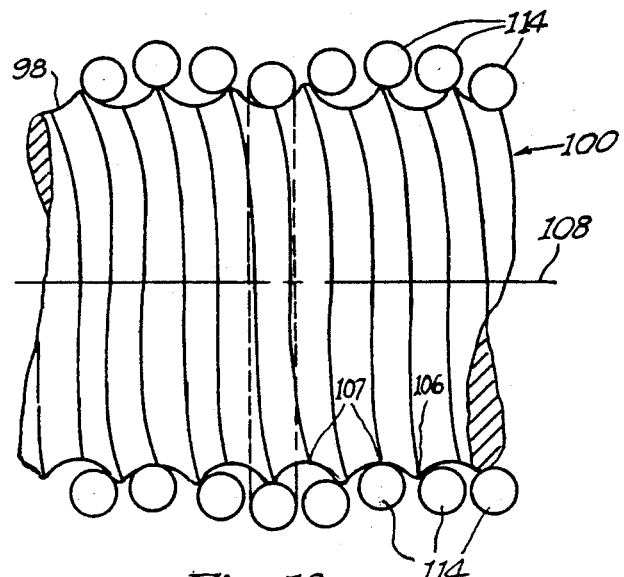
FIG. 18 shows the screw portion of the third embodiment of the subject invention.
Figure 19:
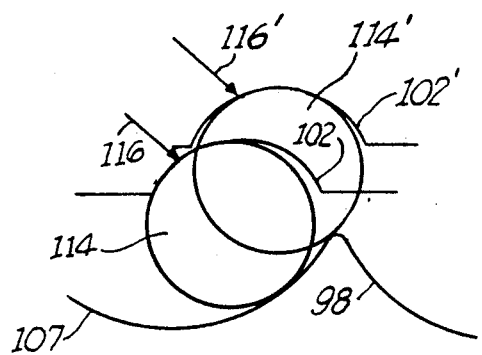
FIG. 19 shows the manner in which the bearing balls contact the thread leads for the embodiment shown by FIGS. 16 through 18.
Figure 20:
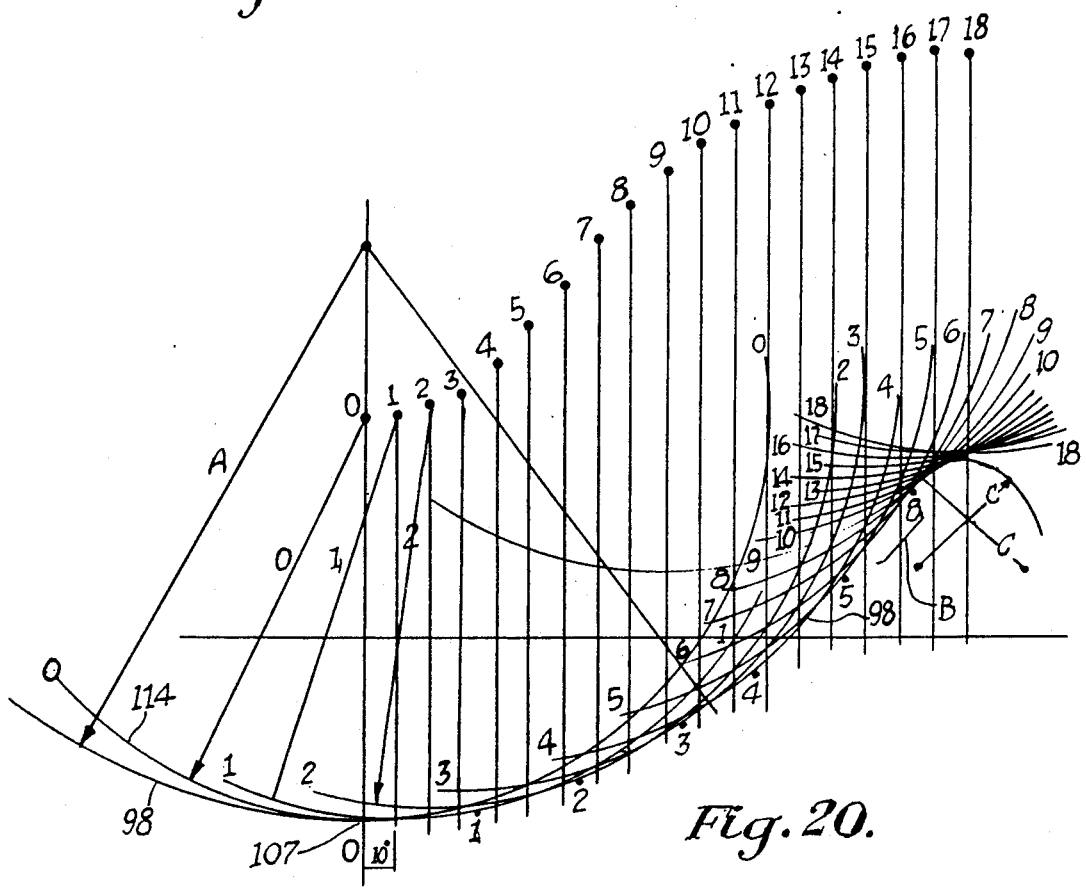
FIG. 20 shows the manner for laying out the shape of the track containing the bearing balls for the embodiment of the subject invention shown in FIGS. 16 through 18.

Referring now to FIGS. 16 through 20, another preferred embodiment of the subject invention will be described. In the FIG. 16 through 20 mechanism, the shape of the threads 98 of a singled leaded screw 100 are first selected and then the shape of the tracks 102A through 102H of nut 104 are determined. The specific shape of threads 98 is shown in detail in FIG. 20, and includes arcs A and C connected by a straight line segment B. In addition, the point at the thread peak 106, which would be normally formed by two intersecting arcs C, is rounded in order to avoid surfaces which wear too rapidly. The shape of thread design shown in FIG. 20 is preferable to the sinusoidal shape previously discussed because greater drive forces between the bearing balls 114, contained in the tracks 102 of nut 104, and thread 98 can be achieved.

Referring now to FIG. 20, with the shape of thread 98 being defined, it is then necessary to determine the proper shape for tracks 102A through 102H. The first step is to divide the axial distance between the valley 107 and the peak 106 of thread 98 into eighteen even spaces. This may be accomplished by drawing nineteen parallel and evenly spaced lines, labeled 0 through 18 as seen in FIG. 20, between valley 107 and peak 106. Next, an arc, equal to the radius of the bearing balls 114 which will be used in nut 104, is struck from each of the lines 0 through 18 tangent to thread 98. The center points of each of the arcs is then noted by the + and the distance vertically from thread 98 to that center axis 108 of screw 100 is recorded. It should be noted that arcs 14 through 18 may be selected to be above thread 98 in order to avoid wear at the peak 106 where the axial drive force is minimal.

Figures 16, 17:
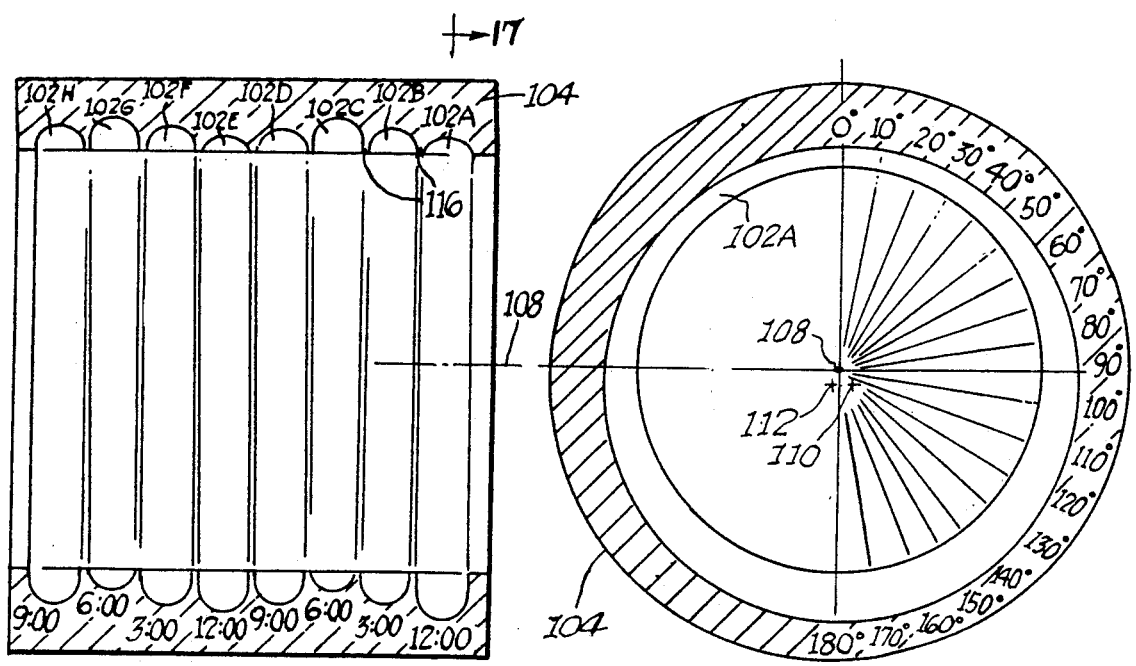
FIG. 16 shows a cut-away view of the nut of another embodiment of the subject invention.
FIG. 17 shows an end view of the nut shown in FIG. 16.

Referring now to FIG. 17, in order to lay out the shape of track 102A, the measured distance from each of the radial points 0 through 18, shown as + in FIG. 20, to the axial center 108 of screw 100 is used. This measured distance, plus one-half of the diameter of each ball 114, is then used to determine the size and shape of track 102A at the various angular positions thereof from 0° to 180°. More specifically, the measured and recorded distance for each line 0 through 18 from FIG.

20, plus one half of the bearing ball 114 diameter, is plotted for each radial line 0° through 180° in FIG. 17, respectively. The left side of nut 104 in FIG. 17 will be the mirror image of the right side for laying out channel 102A. Thus, channel 102A is actually somewhat egg shaped. While the actual shape of track 102A is complex, it can be approximated by a semicircle eccentric from points 110 and 112 shown in FIG. 17.

Referring again to FIG. 16, nut 104 includes eight different tracks, labeled 102A through 102H. Tracks 102A through 102D may be oriented respectively at 0°, 90°, 180° and 270°, or 12:00, 3:00, 6:00 and 9:00, respectively, with the orientation in FIG. 17 being at 0°, or 12:00. Thus, track 102B would be the same as the FIG. 17 view rotated clockwise by ninety degrees. Similarly, track 102C would be the same as the FIG. 17 view rotated one hundred and eighty degrees and track 102D would be the same as the FIG. 17 view rotated two hundred and seventy degrees. Tracks 102E through 102H are similar in orientation to tracks 102A through 102D.

The spacing and pitch of each of tracks 102A through 102H is important to proper operation of the screw and nut machine shown in FIGS. 16 through 18. As with the situation represented by FIGS. 8B and 11, whenever the track spacing is at 90°, the pitch of the tracks 102 of balls 114 should be at one of one-fourth, three-fourths, five-fourths, and so forth of the pitch of the threads 98 of screw 100. Preferably, the track 102 pitch should be at three-fourths the thread 98 pitch in order to make nut 104 as compact as possible. Thus, the pitch of both tracks 102A through 102D and 102E through 102H is selected to be three-fourths of thread 98 pitch of screw 100.

One exception to the standard pitch is made in that the distance between tracks 102D and 102E is made slightly greater than the distance between any of the other tracks 102A through 102H. For example, this distance may be approximately 0.00125 inches greater in a design where the center to center spacing between the remaining tracks is 0.150 inches and the threads 98 pitch is 0.200 inches, or five threads per inch. The reason for separating the two sets of tracks 102A through 102D and 102E through 102H separated by an amount slightly greater than the pitch, is to provide forward and reverse axial drive orientations for the various tracks, that is, to inhibit backlash between the screw 100 and nut 104. Another technique to inhibit backlash would be to provide a slight variance in the orientation of the two sets of tracks 102, such as by making the orientation of tracks 102E through 102H orientated at 1°, 91°, 181° and 271° respectively.

In addition, the radius provided for each of the tracks 102A through 102H is made slightly greater than the radius of the bearing balls 114 that will rest between the track 102 channel and screw 100 thread 98. Referring specifically to FIG. 19, a bearing ball 114 is shown in two different positions 114 and 114' positioned between thread 98 and a track 102 or 102'. It is seen that as ball 114 moves to the 114' position, it moves higher into the track, at 102', as indicated by the arrows 116 and 116'. These arrows 116 and 116' represent both the contact point and the direction of the driving force of ball 114 or 114' against thread 98. The reason for making the size of the tracks 102 slightly greater than the size of ball 114 is to permit ball 114, when in the 114' position, to slide upward into the track. This relieves the pressure against the point of greatest wear, near thread peak 106. Further, the amount of drive provided is minimized at peak 106, due to the vertical orientation line 116 would take when contact is at peak 106. As recalled from FIG. 20, the actual layout actually increased the depth of the channel of the tracks 102 at the peak to eliminate hard contact around the peak 106. In other words, any ball 114 contained in a track 102 at a position opposite to a thread peak 106 does not contact both the thread 98 and the track 102 at the same time. The example shown in FIG. 19 would be for tracks 102A through 102D; for tracks 102E through 102H the same effect would occur on the opposite side of thread 98.

One of the problems which may be encountered with the embodiment shown in FIG. 16, is that the distance separating the various tracks 102A through 102H may be too short, thereby creating very narrow ledges between the tracks which will be subject to easy breakage. This is particularly true of the small edge 116, seen in FIG. 16. In order to increase the width of edge 116, one may desire to either use smaller bearing balls 114. Alternatively, one could increase the track 102 pitch. However, with the four tracks oriented at 90°, as shown in FIGS. 16 and 18, this would require increasing the track 102 pitch to five-fourths of the thread 98 pitch, which in turn, would substantially increase the length of nut 104.

Another alternative to increasing the size of the edges 116 is to place the tracks at a pitch of four-fifths, rather than three-fourths, of the pitch of the threads 98. If this were to occur a fifth track for each of the forward and reverse sections would be required and the orientation would be at 72° rather than 90° for each of the groups of five tracks. Thus, a total of ten tracks would be used in the embodiment shown in FIGS. 16 through 18. Similarly, six tracks per section could be used at a spacing of five-sixths of the pitch of the threads 98 and an orientation of 60° with respect to one another.

What is claimed is:

1. A machine for translating rotational motion about an axis to motion parallel to said axis comprising:
   a first member having a helical thread;
   a plurality of rolling elements; and
   a second member having a plurality of non circular tracks for containing said rolling elements around said first member, a common point of each rolling element contained in each track being oriented along a single plane, one of said first or second members being rotatable to cause the axial movement of the other of said first or second members.

2. The invention according to claim 1 wherein said rolling elements are spheres and said common point is the radial center of said spheres.

3. The invention according to claim 2 wherein said first member is a screw and said second member is a nut.

4. The invention according to claim 1 wherein said tracks each have a peripheral shape related to the shape of said thread such that at least two of said rolling elements of each track contacts said first member.

5. The invention according to claim 1 wherein said tracks each have a peripheral shape related to the cross-sectional profile of said first member at the position of that track around said first member.

6. A screw and nut machine comprising:
   a screw having a helical thread with a specific thread to adjacent thread profile, each thread having a peak and a valley;
   a plurality of bearing balls; and
   a nut having a plurality of planar tracks for containing said balls, each track being peripherally shaped in response to said thread to adjacent thread profile to permit at least two of said contained balls of each track to contact both said thread and said track at the same time, said track and said thread to adjacent thread profile being relatively shaped so that any ball contained in a track at a position opposite to a thread peak does not contact both said thread and said track at the same time.

7. The invention according to claim 6:
wherein said screw rotates and said balls are rotated around each track; and
wherein each track is shaped so that at least two of said balls are in contract with said thread and track at any given time as said balls rotate around said track.

8. The invention according to claim 6:
wherein said thread has a given pitch; and
wherein said tracks are separated by a distance different than said thread pitch.

9. The invention according to claim 8, wherein adjacent ones of said tracks are oriented differently.

10. The invention according to claim 9, wherein the number of tracks and orientation of each track is selected to provide pitch and yaw stability between said screw and nut.

11. The invention according to claim 9:
wherein said screw rotates and said balls are rotated around said track; and
wherein each track is shaped so that at least some of said balls are in contract with said thread and track at any given time as said balls rotate around said track.

12. The invention according to claim 11, wherein said track has a cross-sectional profile greater than said balls.

13. The invention according to claim 12, wherein said plurality of tracks are divided into two groups, each group having a constant pitch, the separation between the adjacent end tracks of said two groups of tracks being slightly greater than the separation between adjacent tracks within each group.

14. The invention according to claim 6, wherein said track has a cross-sectional profile greater than said balls.

15. The invention according to claim 14, wherein said plurality of tracks are divided into two groups, each group having a constant pitch, the separation between the adjacent end tracks of said two groups of tracks being slightly greater than the separation between adjacent tracks within each group.

16. The invention according to claim 6, wherein adjacent ones of said tracks are oriented differently.

17. The invention according to claim 16, wherein the number of tracks and orientation of each track is selected to provide pitch and yaw stability between said screw and nut.

18. The invention according to claim 6 wherein the peripheral shape of each track is noncircular.

19. A machine for translating rotational motion to motion parallel to the axis of said rotational motion, said machine comprising:
a first member having a helical thread;
a plurality of bearing balls;
a second member having at least one planar track for containing said bearing balls, one of said first or second members being rotatable, each track being peripherally shaped relative to the cross-sectional profile of said first member at the position of that track around said first member to permit at least one of said bearing balls of each track to contact said first member; and
carrier means for maintaining said bearing balls around said first member and within said track, said carrier means being cylindrical in shape and including a plurality of circular openings circumferentially grouped in a plurality of common planes coincident with the plane of said track, each opening having a diameter at least as great as said bearing balls, the axis of said carrier means being coincident with the axis of said first member.

20. The invention according to claim 19, wherein said second member has a plurality of tracks and each track is oriented non-concentrically with respect to said first member.

21. The invention according to claim 20, wherein the number of tracks and orientation of each track is selected to provide pitch and yaw stability between said first and second members.

22. The invention according to claim 19:
wherein said second member has a plurality of tracks; and
wherein the shape of said thread and the shape of each track are selected to permit at least two of said bearing balls contained in each track to be in contact with both said thread and that track at all times.

23. The invention according to claim 19, wherein said carrier means includes a plurality of round openings having a diameter at least as great as said bearing balls.

24. The invention according to claim 23, wherein said openings are aligned circumferentially around said carrier means.

25. The invention according to claim 24, wherein each bearing ball is inserted through one opening of said carrier means.

26. The invention according to claim 19, wherein each bearing ball is inserted through one opening of said carrier means.

27. The invention according to claim 19, wherein said said second member has a plurality of tracks and at least two bearing balls contact each track and said first member.

28. The invention according to claim 27, wherein each track is oriented non-concentrically with respect to said first member.

29. The invention according to claim 28, wherein the number of tracks and orientation of each track is selected to provide pitch and yaw stability between said first and second members.

30. The invention according to claim 19:
wherein said thread has peaks and valleys and a certain peak to adjacent peak profile; and
wherein said track peripheral shape and said profile are relatively shaped so that any ball contained in a track at a position opposite to a thread peak does not contact both said thread peak and said track at the same time.

31. The invention according to claim 30 wherein each track has a cross-sectional profile greater than the diameter of said ball.

32. A screw and nut machine comprising:
a screw having a helical thread of a certain pitch;
a plurality of bearing balls; and
a nut having a plurality of noncircular planar tracks for containing said bearing balls, each track being peripherally shaped in relation to a cross-sectional profile of said screw at the position of that track around said screw, each track further having a non-concentric orientation with respect to said screw and at least two of said tracks being oriented differently.

33. The invention according to claim 32, wherein said nut has at least five tracks.

34. The invention according to claim 33, wherein the first and fourth tracks are oriented with respect to said screw from a certain angle, said second and fifth tracks being oriented with respect to said screw at 120° from said certain angle and said third track being oriented with respect to said screw at 240° from said certain angle.

35. The invention according to claim 32, wherein the number of tracks is related to the number of different orientations of said tracks.

36. The invention according to claim 32 wherein the number of tracks and orientation of each track is selected to provide pitch and yaw stability between said first and second members.

37. The invention according to claim 32, wherein said plurality of tracks are positioned at a pitch different than said certain pitch.

38. The invention according to claim 32, wherein at least two non-adjacent ones of said tracks are orientated identically.

39. The invention according to claim 38, wherein the number of tracks is related to the number of different orientations of said tracks.

40. The invention according to claim 38, wherein the number of tracks and orientation of each track is selected to provide pitch and yaw stability between said first and second members.

41. The invention according to claim 39, wherein said plurality of tracks are positioned at a pitch different than said certain pitch.

42. The invention according to claim 32:
wherein said screw rotates and said balls are rotated around said track; and
wherein each track is peripherally shaped so that at least some of said balls are in contract with said thread and track at any given time as said balls rotate around said track.

43. A machine for translating rotational motion to motion parallel to the axis of said rotational motion, said machine comprising:
a first member having a helical thread;
a plurality of bearing balls; and
a second member having at least one planar track for containing said bearing balls, one of said first or second members being rotatable, each track being peripherally shaped relative to the cross-sectional profile of said first member at the position of that track around said first member to permit at least one of said bearing balls of each track to contact said first member;
wherein the peripheral shape of each track is noncircular.

44. The invention according to claim 43:
wherein said thread has peaks and valleys and a certain peak to adjacent peak profile; and
wherein said track peripheral shape and said profile are relatively shaped so that any ball contained in a track at a position opposite to a thread peak does not contact both said thread peak and said track at the same time.

45. The invention according to claim 44 wherein each track has a cross-sectional profile greater than the diameter of said ball.

* * * * *